United States Patent
Yang (10) Patent No.: US 8,035,959 B2
(45) Date of Patent: *Oct. 11, 2011

(54) PORTABLE ELECTRONIC DEVICE WITH PROJECTION FUNCTION AND PROJECTION UNIT THEREOF

(75) Inventor: Ching-Fu Yang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 50 days.

This patent is subject to a terminal disclaimer.

(21) Appl. No.: 12/332,367

(22) Filed: Dec. 11, 2008

(65) Prior Publication Data

US 2009/0257183 A1 Oct. 15, 2009

(30) Foreign Application Priority Data

Apr. 9, 2008 (TW) .................................. 97112828

(51) Int. Cl.
*G06F 1/16* (2006.01)
(52) U.S. Cl. .................. 361/679.27; 345/175; 707/737; 600/407

(58) Field of Classification Search .................. 345/156, 345/157, 166, 173, 440, 175, 473; 455/566, 455/556.1, 101; 707/706, 737, 999.006; 600/431, 411, 407, 27; 362/296.07; 361/679.01, 361/679.27, 679.21, 679.56
See application file for complete search history.

(56) References Cited

U.S. PATENT DOCUMENTS

| | | | | |
|---|---|---|---|---|
| 7,233,319 | B2 * | 6/2007 | Johnson et al. | 345/166 |
| 2006/0255890 | A1 * | 11/2006 | Yang | 335/128 |
| 2009/0016003 | A1 * | 1/2009 | Ligtenberg et al. | 361/681 |
| 2009/0257182 | A1 * | 10/2009 | Yang | 361/679.27 |

* cited by examiner

*Primary Examiner* — Hung Duong
(74) *Attorney, Agent, or Firm* — Jianq Chyun IP Office (57) ABSTRACT

A portable electronic device with a projection function includes a host, a projection module, and at least one linkage. The host has an accommodating space. The projection module is situated in the accommodating space. The linkage is disposed between the accommodating space and the projection module for moving out the projection module from the accommodating space.

16 Claims, 12 Drawing Sheets

PORTABLE ELECTRONIC DEVICE WITH PROJECTION FUNCTION AND PROJECTION UNIT THEREOF

CROSS-REFERENCE TO RELATED APPLICATION

This application claims the priority benefit of Taiwan application serial no. 97112828, filed on Apr. 9, 2008. The entirety of the above-mentioned patent application is hereby incorporated by reference herein and made a part of this specification.

BACKGROUND OF THE INVENTION

1. Field of the Invention

The present invention relates to an electronic device and more particularly, to a portable electronic device with a projection function.

2. Description of Related Art

With advancement in projection display technology, there have been rapid development and significant breakthroughs in projection systems and equipment in recent years. Currently, there are three major types of projectors including cathode ray tubes (CRTs), high temperature polysilicon transmissive liquid crystal display panels (commonly referred to as liquid crystal projectors), and digital light source processors, wherein the liquid crystal projectors characterized by portability and easy adjustability are more frequently used by the public.

An operating principle of a projector is the same as that of a transparency or that of a slide, which uses a high-luminance lamp as a light source and projects content onto a white screen or a wall. All images of the projector are projected from a single lens in no need of adjusting the focus of the images. At present, the projector is often used to project and magnify an image on a transparency onto a white screen or a wall for purposes of propaganda, lecture, presentation, and so on. In addition, the projector can be further connected to a computer directly and project images on the computer onto a white screen or a wall, which saves the trouble of making transparencies and further promotes the practice of a paperless office.

However, in the current workplace, the projector is still often used together with a notebook computer in order to display an image on a computer screen onto a large screen or a wall for use in a conference or a demonstration. Consequently, transportation and storage of relevant projection equipment and the notebook computer as well as installation of connections between the projection equipment and the notebook computer result in problems including inconvenient usage as well as difficult and time-consuming installation.

SUMMARY OF THE INVENTION

The present invention is directed to a portable electronic device that allows a user to easily and conveniently retract and use a projection module.

In the present invention, a portable electronic device with a projection function includes a host, a projection module, and at least one linkage. The host has an accommodating space. The projection module is situated in the accommodating space for projecting an image onto a projection surface. The linkage is disposed between the accommodating space and the projection module for moving out the projection module from the accommodating space.

In one embodiment of the present invention, the projection module further comprises a projection main body, a holder, and a pivoted structure, wherein the projection main body and the holder are pivoted by means of the pivot structure.

In one embodiment of the present invention, one of the projection module and one end of the linkage has a bearing, and the other one of the projection module and one end of the linkage has an axle fitting the bearing.

In one embodiment of the present invention, the projection module has a first annular wave-shaped surface, and the linkage has a second annular wave-shaped surface corresponding to the first annular wave-shaped surface to pivot stepwise the projection module relative to the linkage.

In one embodiment of the present invention, the portable electronic device further includes a first component and a second component. The first component is disposed in the projection module. The second component is disposed at the linkage. Here, the first component and the second component have a magnetic attraction force there between to force the first annular wave-shaped surface to contact the second annular wave-shaped surface.

In one embodiment of the present invention, the linkage includes a first linking rod and a second linking rod. The first linking rod has a first end and a second end. Here, the first end is pivoted to the accommodating space. The second linking rod has a third end and a fourth end. Here, the third end is pivoted to the second end of the first linking rod, and the fourth end is pivoted to the projection module.

In one embodiment of the present invention, one of the projection module and the fourth end of the second linking rod has a bearing, and the other one of the projection module and the fourth end of the second linking rod has an axle fitting the bearing.

In one embodiment of the present invention, the projection module has a first annular wave-shaped surface, and the fourth end of the second linking rod has a second annular wave-shaped surface corresponding to the first annular wave-shaped surface to pivot stepwise the projection module relative to the fourth end of the second linking rod.

In one embodiment of the present invention, the portable electronic device further includes a first component and a second component. The first component is disposed in the projection module. The second component is disposed at the fourth end of the second linking rod. Here, the first component and the second component have a magnetic attraction force there between to force the first annular wave-shaped surface to contact the second annular wave-shaped surface.

The present invention provides a projection unit suitable for being disposed in an accommodating space of a portable electronic device. The portable unit includes a projection module and a linkage. The projection module is projecting an image onto a projection surface and has at least one connecting portion. The linkage connects the connecting portion of the projection module for moving out the projection module from the accommodating space.

In one embodiment of the present invention, the projection module further comprises a projection main body, a holder, and a pivoted structure, wherein the projection main body and the holder are pivoted by means of the pivot structure.

In one embodiment of the present invention, one of the projection module and one end of the linkage has a bearing, and the other one of the connecting portion of the projection module and one end of the linkage has an axle fitting the bearing.

In one embodiment of the present invention, the connecting portion of the projection module has a first annular wave-shaped surface, and the linkage has a second annular wave-shaped surface corresponding to the first annular wave-shaped surface to pivot stepwise the projection module relative to the linkage.

In one embodiment of the present invention, the projection unit further includes a first component and a second component. The first component is disposed in the connecting portion of the projection module. The second component is disposed at the linkage. Here, the first component and the second component have a magnetic attraction force there between to force the first annular wave-shaped surface to contact the second annular wave-shaped surface.

In one embodiment of the present invention, the linkage includes a first linking rod and a second linking rod. The first linking rod has a first end and a second end. Here, the first end is pivoted to the accommodating space of the portable electronic device. The second linking rod has a third end and a fourth end. Here, the third end is pivoted to the second end of the first linking rod, and the fourth end is pivoted to the connecting portion of the projection module.

In one embodiment of the present invention, one of the projection module and the fourth end of the second linking rod has a bearing, and the other one of the projection module and the fourth end of the second linking rod has an axle fitting the bearing.

In one embodiment of the present invention, the connecting portion of the projection module has a first annular wave-shaped surface, and the fourth end of the second linking rod has a second annular wave-shaped surface corresponding to the first annular wave-shaped surface to pivot stepwise the projection module relative to the fourth end of the second linking rod.

In one embodiment of the present invention, the projection unit further includes a first component and a second component. The first component is disposed in the connecting portion of the projection module. The second component is disposed at the fourth end of the second linking rod. Here, the first component and the second component have a magnetic attraction force there between to force the first annular wave-shaped surface to contact the second annular wave-shaped surface.

When a user needs to use the projection module of the present invention, the projection module can be moved out from the accommodating space by means of the linkage. Thereby, it is more convenient for the user to project an image of the display unit without additionally purchasing a conventional projector, such that troublesome installation of circuits connected between the conventional projector and the electronic device can be prevented.

In order to make the above and other features and advantages of the present invention more comprehensible, several embodiments accompanied with figures are described in detail below.

DESCRIPTION OF EMBODIMENTS

Figure 1A:
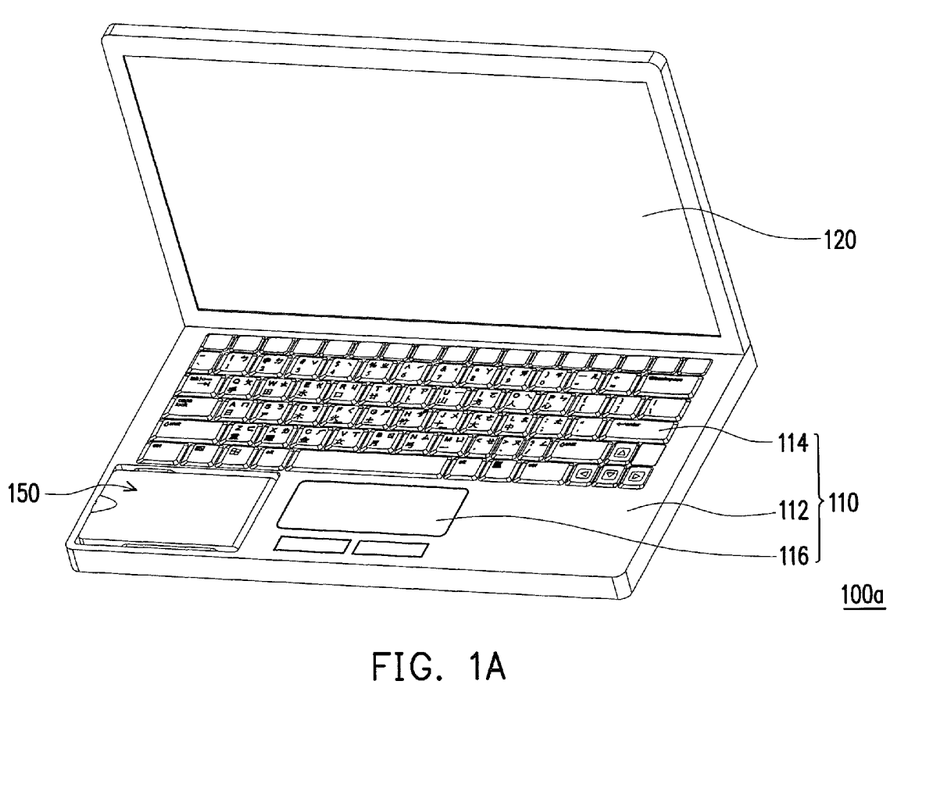
FIG. 1A is a schematic view of a portable electronic device with a projection function according to one embodiment of the present invention.
Figure 1B:
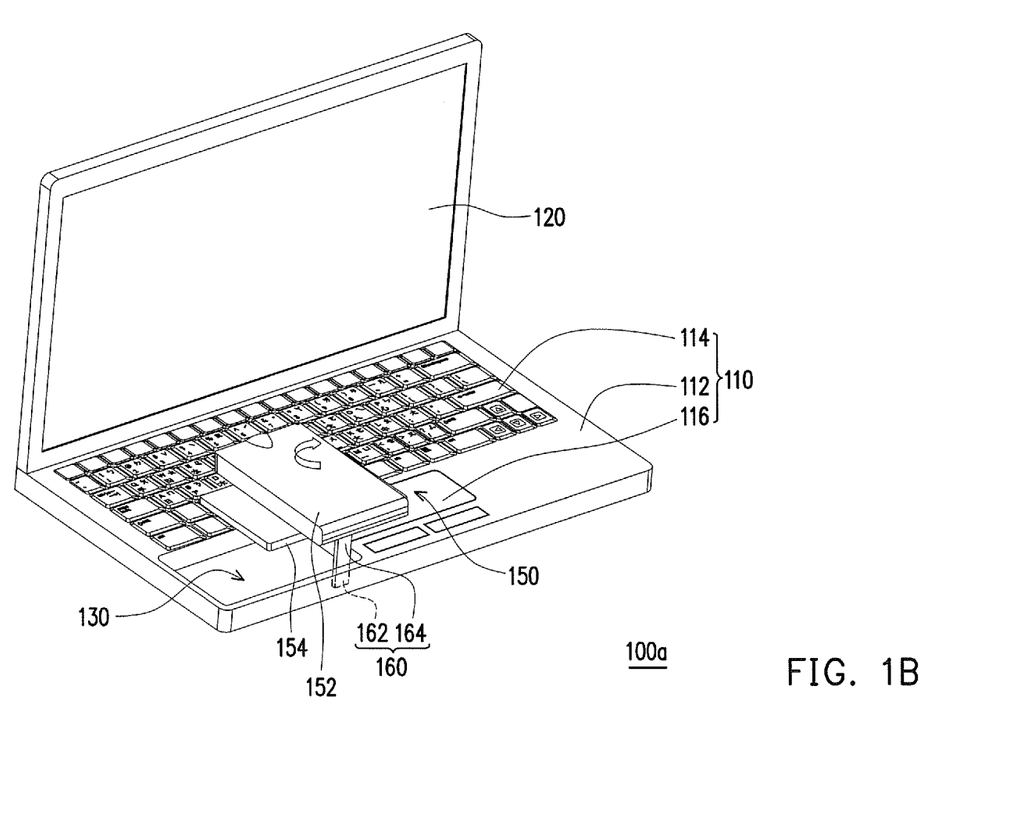
FIG. 1B is a schematic view illustrating a projection main body is pivoted relative to a holder and the projection module is moved out from an accommodating space by means of linkages depicted in FIG. 1A.

FIG. 1A is a schematic view of a portable electronic device with a projection function according to one embodiment of the present invention. FIG. 1B is a schematic view illustrating a projection main body is pivoted relative to a holder and the projection module is moved out from an accommodating space by means of linkages depicted in FIG. 1A. Referring to FIGS. 1A and 1B, in the present embodiment, a portable electronic device 100a includes a host 110, a display unit 120, an accommodating space 130, a projection module 150, and two linkages 160. Here, the portable electronic device 100a is, for example, a notebook computer.

Particularly, the host 110 has an operation surface 112, a keyboard 114, and a cursor control module 116. In this embodiment, the cursor control module 116 which can control the movement of the cursor, such as a touch pad, a touch panel or a track ball, etc. The keyboard 114 and the cursor control module 116 are disposed on the operation surface 112. The display unit 120 is pivoted to the host 110. The accommodating space 130 is located on the operation surface 112 and is near the keyboard 114 and the cursor control module 116. The projection module 150 is situated in the accommodating space 130, and projecting an image onto a projection surface. The linkages 160 are disposed between the accommodating space 130 and the projection module 150 for moving out the projection module 150 from the accommodating space 130.

Referring to FIG. 1B, in the present embodiment, there are two linkages 160, and each of the linkages 160 has a first end 162 and a second end 164. The first end 162 is pivoted to the accommodating space 130, and the second end 164 is pivoted to the projection module 150. Therefore, when a user needs to use the projection module 150, the projection module 150 thereon can be moved out from the accommodating space 130 by the linkages 160, and an image on the display unit 120 is projected by the projection module 150, such that it is more simple and convenient for the user to operate and use the projection module 150.

Figure 1C:
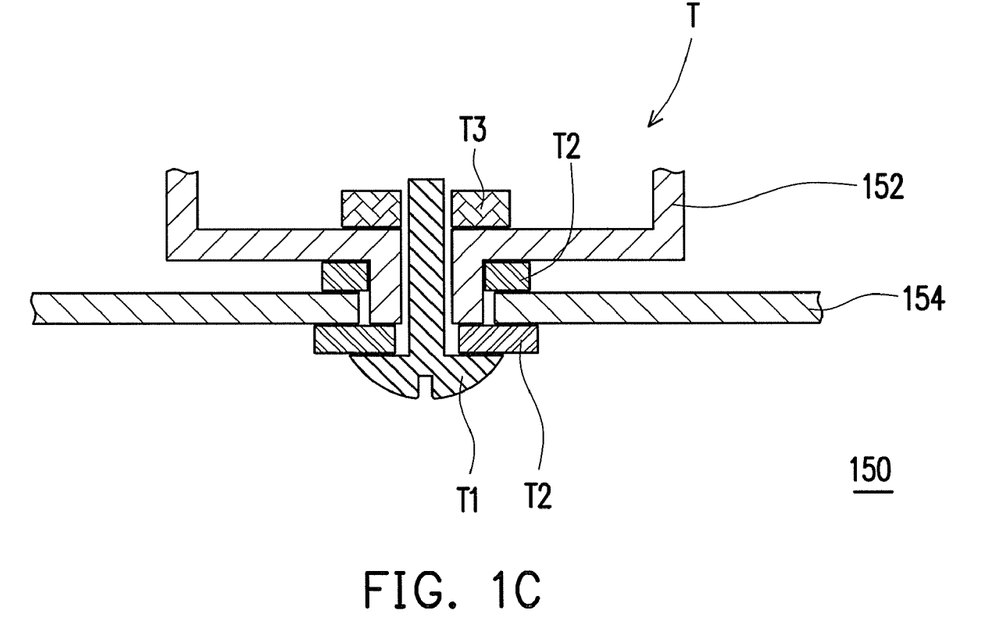
FIG. 1C is a schematic view illustrating a pivot structure between the projection main body and the holder depicted in FIG. 1B.

FIG. 1C is a schematic view illustrating a pivot structure between the projection main body and the holder depicted in FIG. 1B. Referring to FIGS. 1B and 1C, in the present embodiment, the projection module 150 includes a projection main body 152, a holder 154, and a pivot structure T. The pivot structure T including a screw T1, a plurality of washers T2, and a nut T3 by which the projection main body 152 and the holder 154 are fixed to each other. Based on actual demands, the projection main body 152 can be pivoted relative to the holder 154 with use of the screw T1 as an axle. As such, it is more simple and convenient to operate and use the projection module 150.

In brief, by using the linkages 160 to move out the projection module 150 thereon from the accommodating space 130, a user may more easily and conveniently make use of the projection module 150 without needing to additionally purchase a conventional projector, such that troublesome installation of circuits connected between the conventional projector and the electronic device can be prevented. At the same time, an application range of the portable electronic device 100a can be expanded.

Figure 2A:
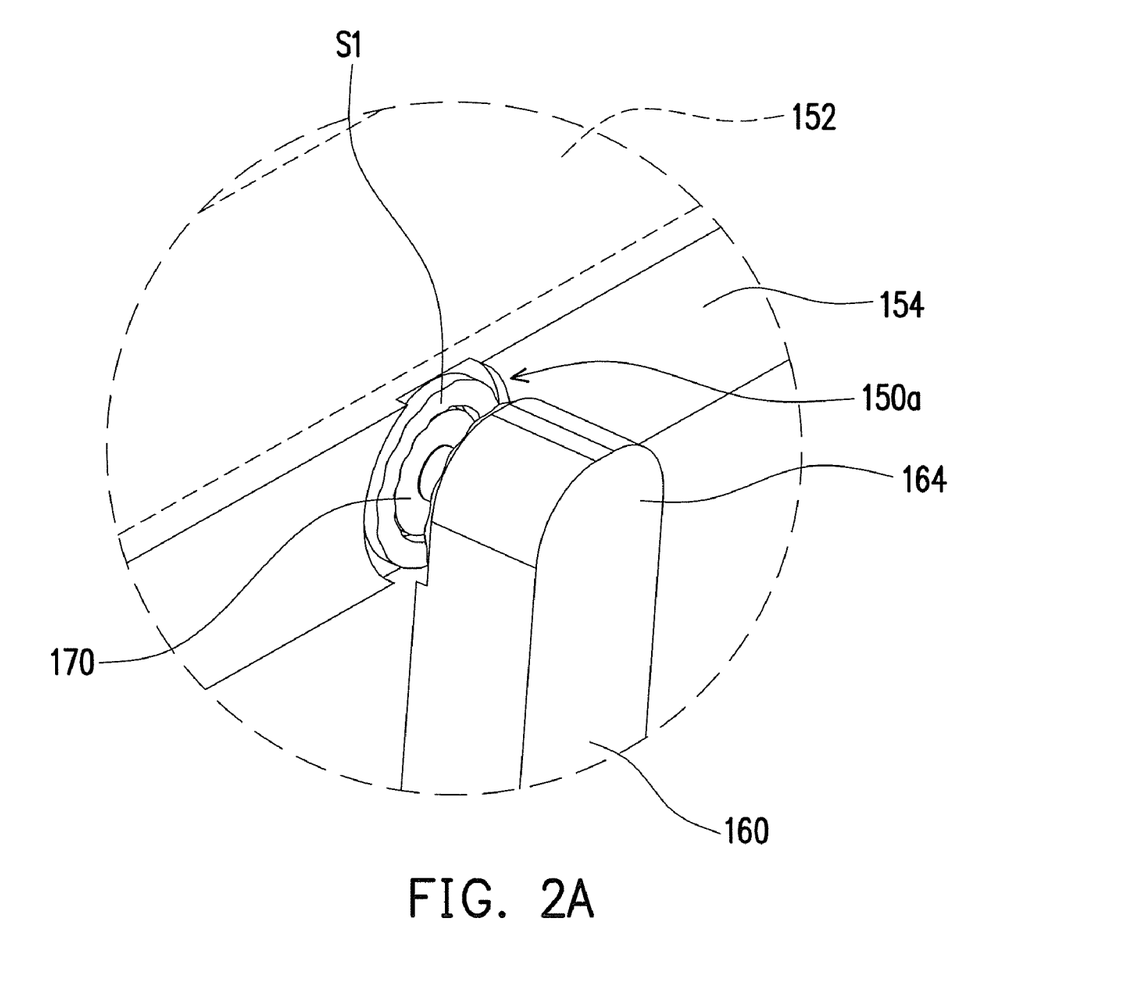
FIG. 2A is a schematic partial enlarged view of the holder and a second end of the linkage depicted in FIG. 1B.
Figure 2B:
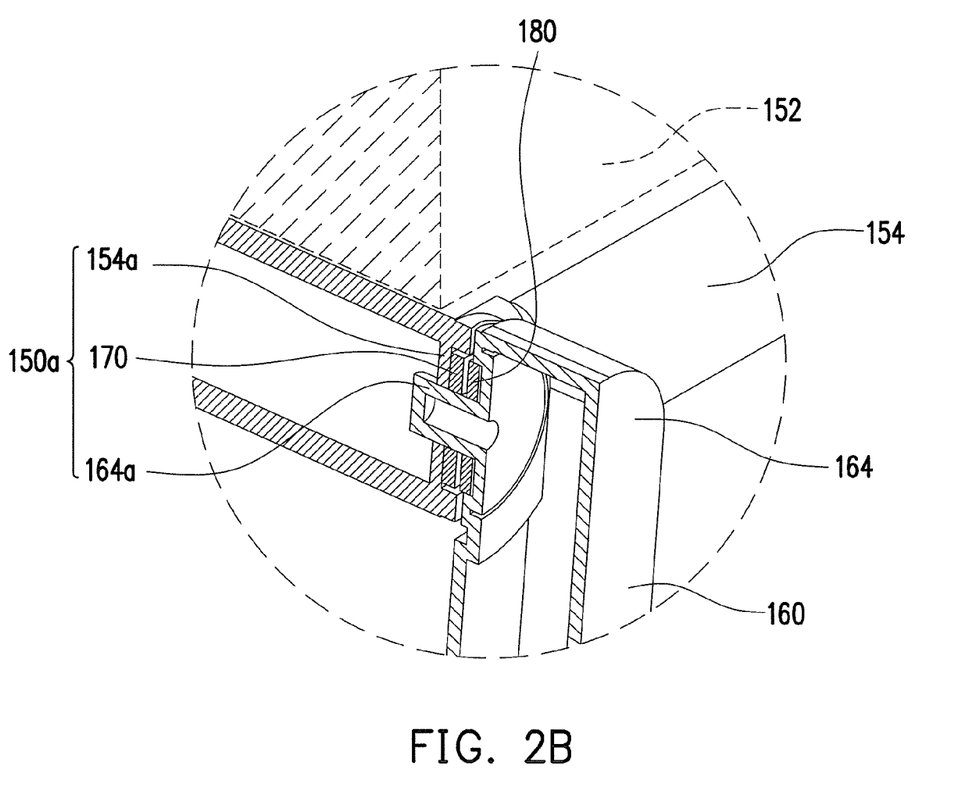
FIG. 2B is a partial cross-sectional view of the holder and the second end of the linkage depicted in FIG. 2A.

FIG. 2A is a schematic partial enlarged view of the holder and a second end of the linkage depicted in FIG. 1B. FIG. 2B is a partial cross-sectional view of the holder and the second end of the linkage depicted in FIG. 2A. Referring to FIGS. 2A and 2B, in the present embodiment, the projection module 150 (as shown in FIG. 1B) has at least one connecting portion 150a, and the linkage 160 connects to the connecting portion 150a of the projection module 150. In detail, the holder 154 of the projection module 150 has a bearing 154a, and the second end 164 of the linkage 160 has an axle 164a fitting the bearing 154a. Here, the bearing 154a is utilized for keeping the axle 164a to be centrally positioned.

It should be mentioned that the positions of the bearing 154a and the axle 164a are not limited to those described in the present invention. In another embodiment, the second end 164 of the linkage 160 may be equipped with the bearing 154a, and the projection module 150 may have the axle 164a fitting the bearing 154a, which still belongs to a technical means adoptable in the present invention and falls within the protection scope of the present invention.

Figure 2C:
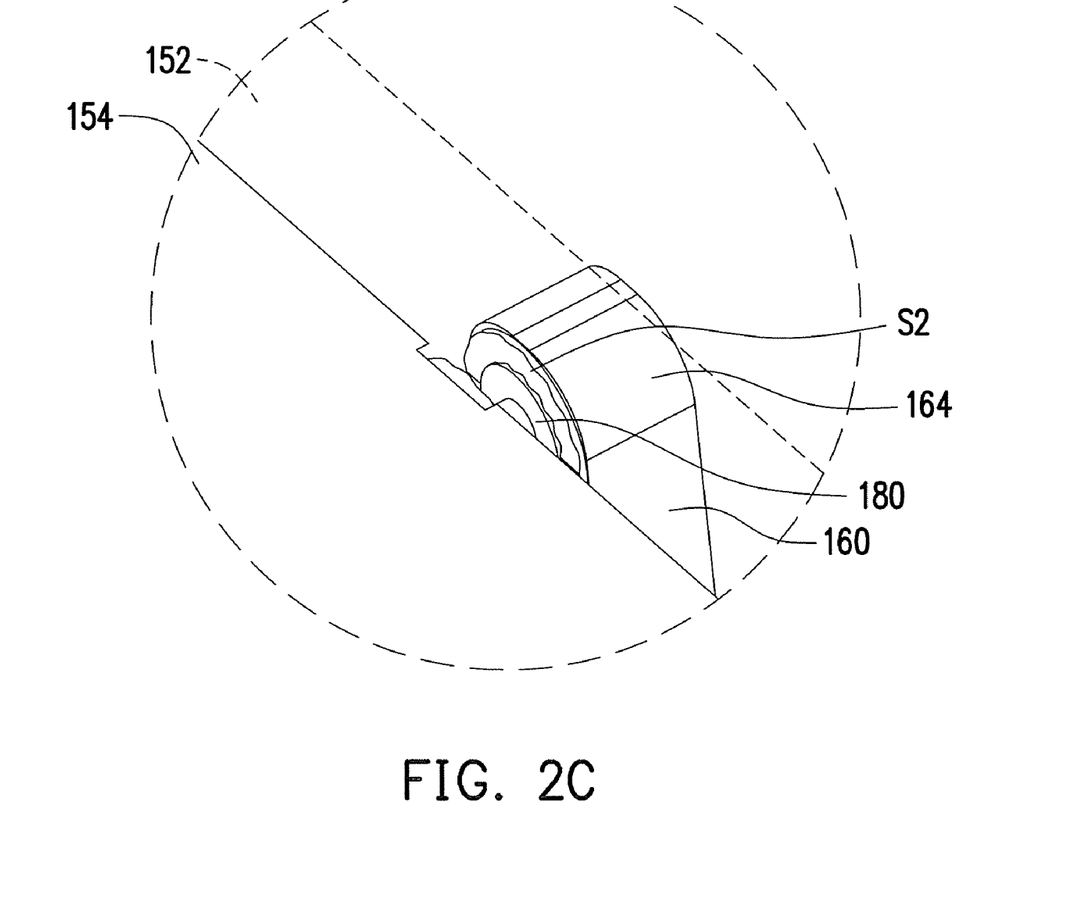
FIG. 2C is a schematic view of the holder and the second end of the linkage depicted in FIG. 2A from another viewing angle.

FIG. 2C is a schematic view of the holder and the second end of the linkage depicted in FIG. 2A from another viewing angle. Referring to FIGS. 2A and 2C, in the present embodiment, the holder 154 of the projection module 150 (as shown in FIG. 1B) has a first annular wave-shaped surface S1, and the second end 164 of the linkage 160 has a second annular wave-shaped surface S2 corresponding to the first annular wave-shaped surface S1 to pivot stepwise the projection module 150 relative to the second end 164 of the linkage 160.

In addition, in the present embodiment, the portable electronic device 100a further includes a first component 170 and a second component 180, wherein the first component 170, the bearing 154a and the axle 164a form the connection portion 150a of the projection module 150. The first component 170 is disposed in the holder 154 of the projection module 150. The second component 180 is disposed at the second end 164 of the linkage 160. Here, the first component 170 and the second component 180 have a magnetic attraction force there between to force the first annular wave-shaped surface S1 to contact the second annular wave-shaped surface S2.

Noted that the first component 170 is a permanent magnet and the second component 180 is a magnetically sensitive component according to the present embodiment. However, the present invention does not limit the types of the first component 170 and the second component 180. In another embodiment, the second component 180 may be a permanent magnet and the first component 170 may be a magnetically sensitive component, which still belongs to a technical means adoptable in the present invention and falls within the protection scope of the present invention.

In detail, the magnetic attraction force between the first component 170 and the second component 180 forces the first annular wave-shaped surface S1 to contact the second annular wave-shaped surface S2. Besides, a pivot angle of the projection module 150 relative to the second end 164 of each of the linkages 160 is adjusted by pivoting the first annular wave-shaped surface S1 relative to the second annular wave-shaped surface S2.

Namely, the pivot angle of the projection module 150 relative to the linkage 160 can be adjusted stepwise. Additionally, a user is able to adjust a position of a projected image by pivoting the projection module 150 relative to the linkage 160. Thereby, the projection module 150 can be used in a relatively simple and easy manner.

Figure 3A:
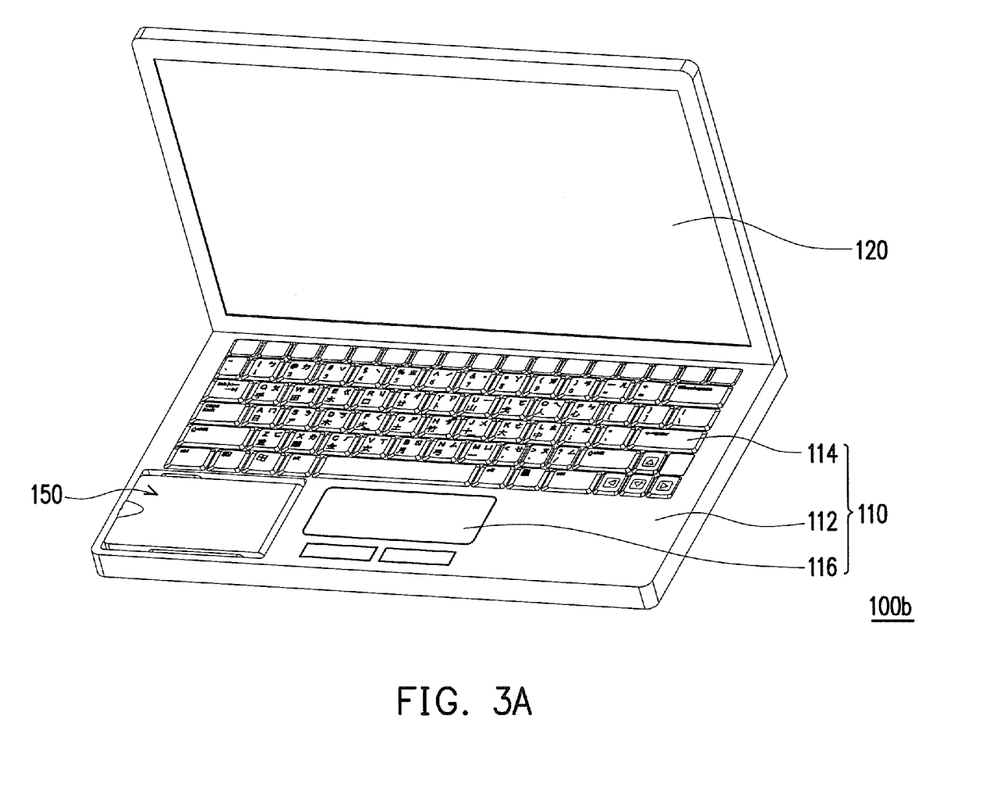
FIG. 3A is a schematic view of a portable electronic device with a projection function according to another embodiment of the present invention.
Figure 3B:
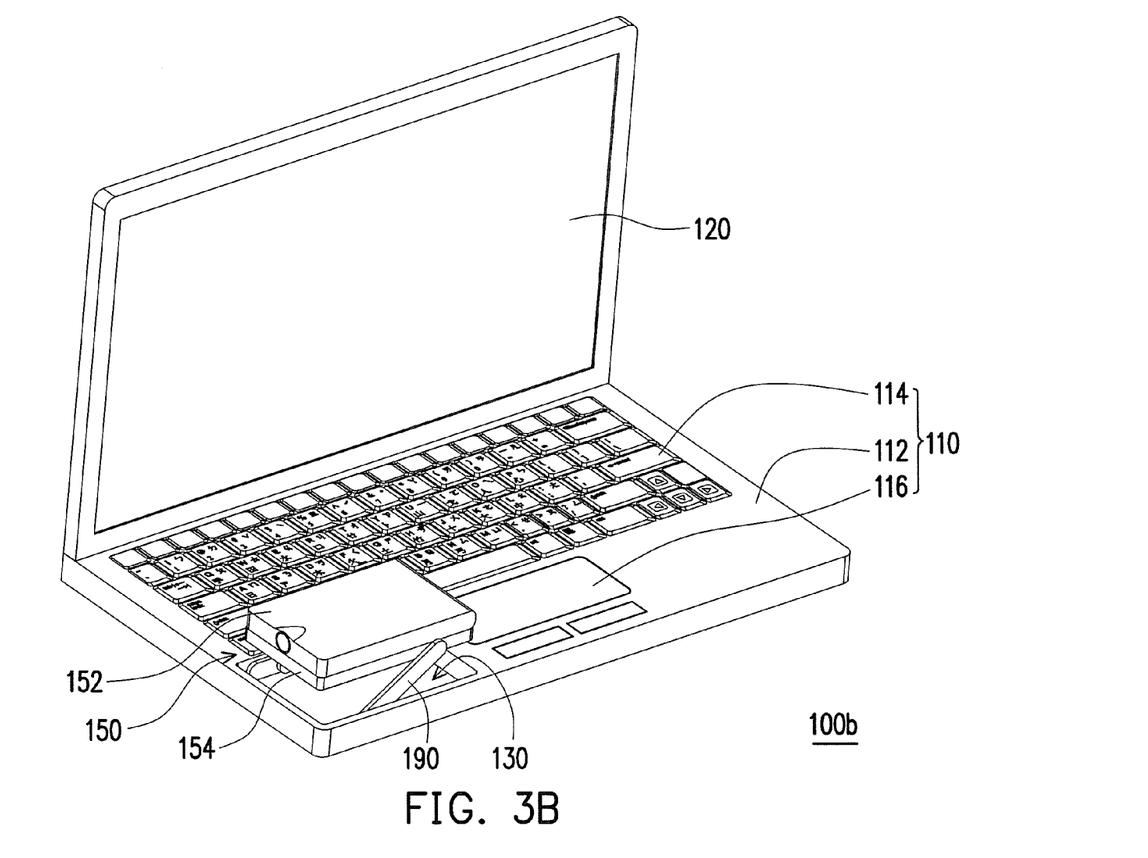
FIG. 3B is a schematic view illustrating a projection module is moved out from an accommodating space by means of linkages depicted in FIG. 3A.

FIG. 3A is a schematic view of a portable electronic device with a projection function according to another embodiment of the present invention. FIG. 3B is a schematic view illustrating a projection module is moved out from an accommodating space by means of linkages depicted in FIG. 3A. Referring to FIGS. 3A and 3B, in the present embodiment, a portable electronic device 100b includes a host 110, an accommodating space 130, a projection module 150, and two linkages 190. Here, the portable electronic device 100b is, for example, a notebook computer.

Particularly, the host 110 has an operation surface 112, a keyboard 114, and a cursor control module 116. The keyboard 114 and the cursor control module 116 are disposed on the operation surface 112. The display unit 120 is pivoted to the host 110. The accommodating space 130 is located on the operation surface 112 and is near the keyboard 114 and the cursor control module 116. The projection module 150 is situated in the accommodating space 130, and projecting an image onto a projection surface. The linkages 190 are disposed between the accommodating space 130 and the projection module 150 for moving out the projection module 150 from the accommodating space 130.

Figure 3C:
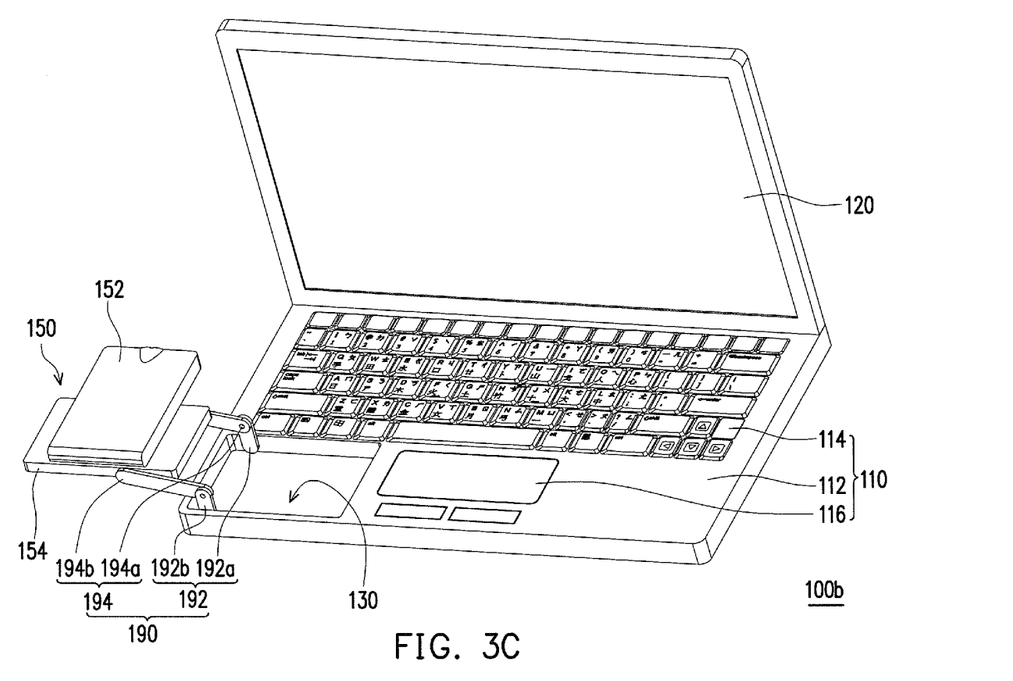
FIG. 3C is a schematic view illustrating a projection main body is pivoted relative to a holder and the projection module is moved out from the accommodating space by means of linkages depicted in FIG. 3B.

FIG. 3C is a schematic view illustrating a projection main body is pivoted relative to a holder of the projection module, and the projection module is moved out from the accommodating space by means of linkages depicted in FIG. 3B. Referring to FIGS. 3B and 3C, in the present embodiment, the linkage 190 includes two first linking rods 192 and two second linking rods 194. Each of the first linking rods 192 has a first end 192a and a second end 192b. Here, the first end 192a is pivoted to the accommodating space 130. Each of the second linking rods 194 has a third end 194a and a fourth end 194b. Here, the third end 194a is pivoted to the second end 192b, and the fourth end 194b is pivoted to the projection module 150.

Specifically, when a user needs to use the projection module 150, the projection module 150 can be moved out from the accommodating space 130 by carrying the first linking rods 192 through the second linking rods 194 of the linkage 190, and an image on the display unit 120 is projected by the projection module 150. The projection module 150 includes a projection main body 152, a holder 154, and a pivot structure (not shown), wherein the projection main body 152 and the holder 154 are pivot by means of the pivot structure. As such, it is more simple and convenient for the user to operate and use the projection module 150 as shown in FIG. 3C.

In brief, by using the linkage 190 to move out the projection module 150 from the accommodating space 130, a user may more easily and conveniently make use of the projection module 150 without needing to additionally purchase a conventional projector, such that troublesome installation of circuits connected between the conventional projector and the electronic device can be prevented. At the same time, an application range of the portable electronic device 100b can be expanded.

Figure 4A:
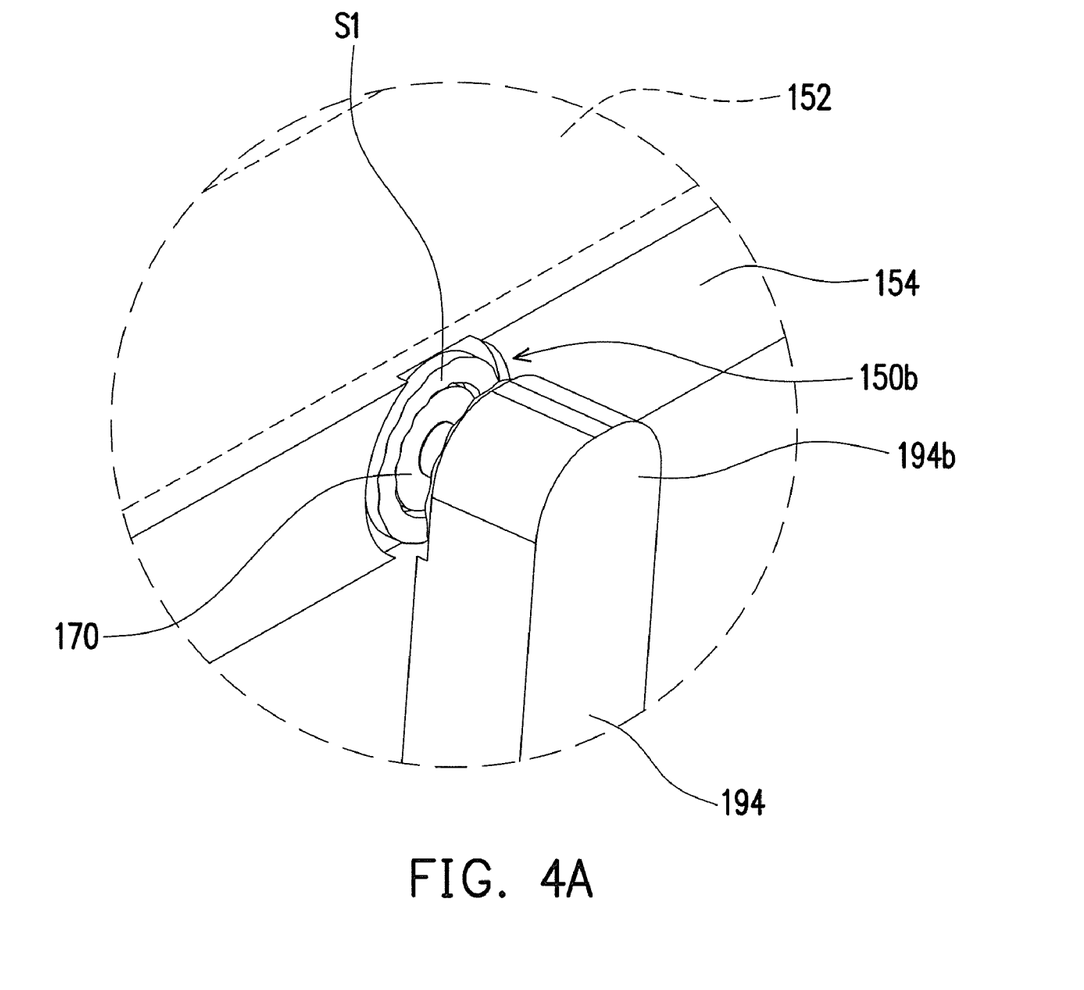
FIG. 4A is a schematic partial enlarged view of the holder and one of second linking rods depicted in FIG. 3C.
Figure 4B:
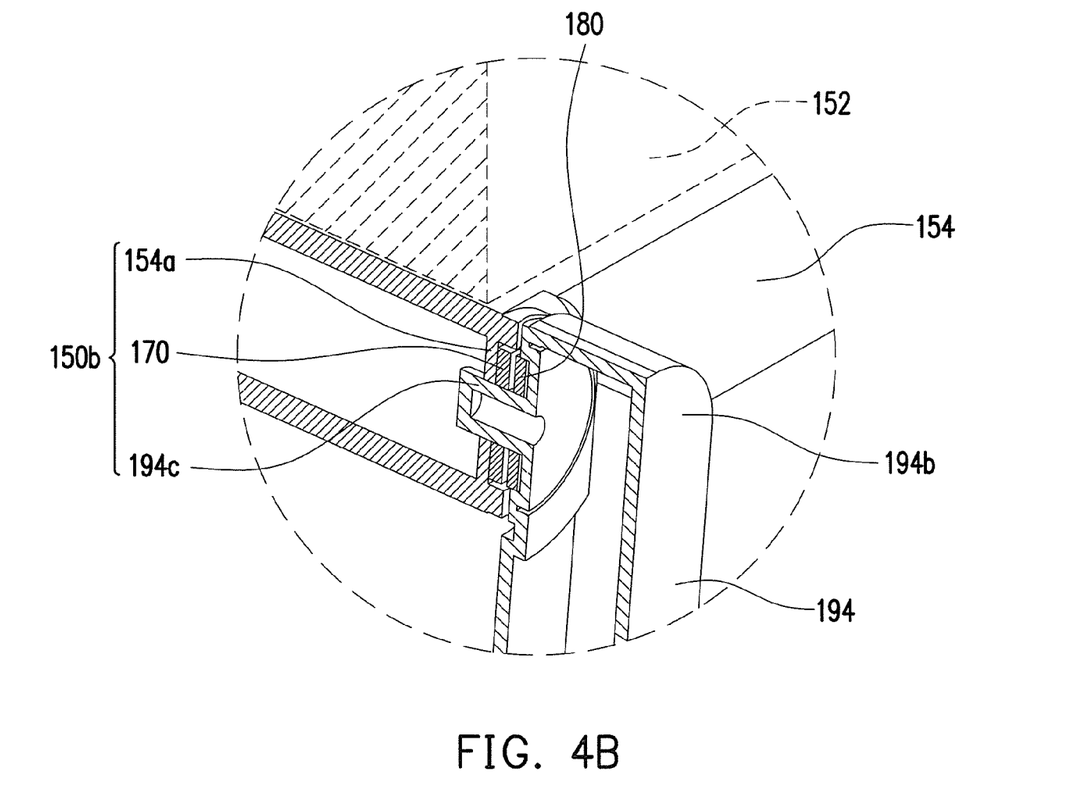
FIG. 4B is a partial cross-sectional view of the holder and one of the second linking rods depicted in FIG. 4A.

FIG. 4A is a schematic partial enlarged view of the holder and one of the second linking rods depicted in FIG. 3C. FIG. 4B is a partial cross-sectional view of the holder and one of the second linking rods depicted in FIG. 4A. Referring to FIGS. 4A and 4B, in the present embodiment, the projection module 150 (as shown in FIG. 3C) has at least one connecting portion 150b, and the linkage 190 connects to the connecting portion 150b of the projection module 150. In detail, the holder 154 has a bearing 154a, and the fourth end 194b of the second linking rod 194 has an axle 194c fitting the bearing 154a.

It should be mentioned that the positions of the bearing 154a and the axle 194c are not limited to those described in the present invention. In another embodiment, the fourth end 194b of the second linking rod 194 may be equipped with the bearing 154a, and the holder 154 may have the axle 194c fitting the bearing 154a, which still belongs to a technical means adoptable in the present invention and falls within the protection scope of the present invention.

Figure 4C:
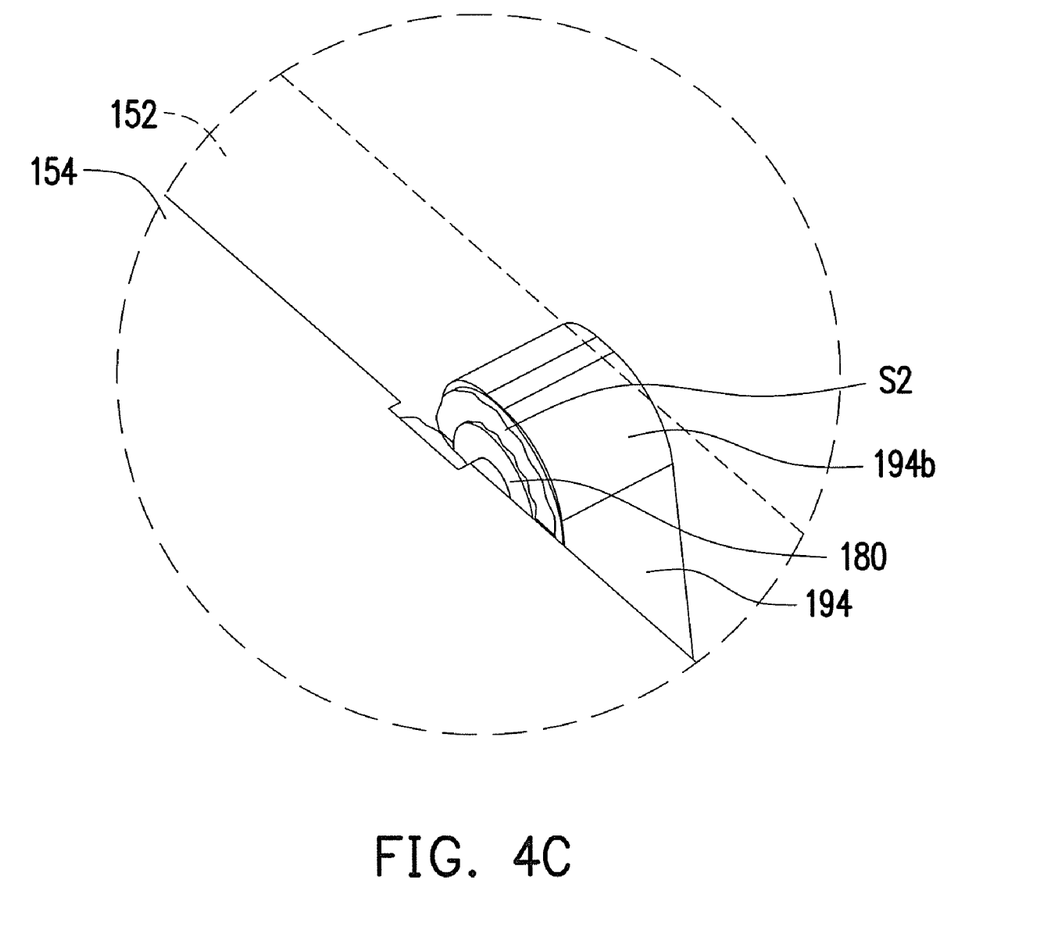
FIG. 4C is a schematic view of the holder and one of the second linking rods depicted in FIG. 4A from another viewing angle.

FIG. 4C is a schematic view of the holder and one of the second linking rods depicted in FIG. 4A from another viewing angle. Referring to FIGS. 4A and 4C, in the present embodiment, the holder 154 has a first annular wave-shaped surface S1, and the fourth end 194b of the second linking rod 194 has a second annular wave-shaped surface S2 corresponding to the first annular wave-shaped surface S1 to pivot stepwise the holder 154 relative to the fourth end 194b of the second linking rod 194.

In addition, in the present embodiment, the portable electronic device 100b further includes a first component 170 and a second component 180, wherein the first component 170, the bearing 154a and the axle 194c form the connection portion 150b of the projection module 150. The first component 170 is disposed in the holder 154 of the projection module 150. The second component 180 is disposed at the fourth end 194b of the second linking rod 194. Here, the first component 170 and the second component 180 have a magnetic attraction force there between to force the first annular wave-shaped surface S1 to contact the second annular wave-shaped surface S2.

Note that the first component 170 is a permanent magnet and the second component 180 is a magnetically sensitive component according to the present embodiment. However, the present invention does not limit the types of the first component 170 and the second component 180. In another embodiment, the second component 180 may be a permanent magnet and the first component 170 may be a magnetically sensitive component, which still belongs to a technical means adoptable in the present invention and falls within the protection scope of the present invention.

In detail, the magnetic attraction force between the first component 170 and the second component 180 forces the first annular wave-shaped surface S1 to contact the second annular wave-shaped surface S2. Besides, a pivot angle of the projection module 150 relative to the fourth end 194b of each of the second linking rods 194 is adjusted by pivoting the first annular wave-shaped surface S1 relative to the second annular wave-shaped surface S2.

Namely, the pivot angle of the projection module 150 relative to the linkage 190 can be adjusted stepwise. Additionally, a user is able to adjust a position of a projected image by pivoting the projection module 150 relative to the linkage 190. Thereby, the projection module 150 can be used in a relatively simple and easy manner.

In light of the foregoing, when a user needs to use the projection module of the present invention, the projection module can be moved out from the accommodating space by means of the linkage. Additionally, a position of a projected image can be adjusted by pivoting the projection module relative to the linkage, so as to utilize the project module in an easy and convenient manner.

Moreover, the present invention not only expands the application range of the portable electronic device but also provides a more convenient tool for use during conferences or demonstration. It is neither necessary to additionally purchase a conventional projector nor required to install the circuits connecting the conventional projector to an electronic device, thus giving rise to reduced costs and efficient space utilization.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A portable electronic device with a projection function, comprising:
    a host, having an accommodating space;
    a projection module, situated in the accommodating space and for outputting an image beam; and
    at least one linkage, disposed between the accommodating space and the projection module for moving the projection module out of the accommodating space, wherein one of the projection module and one end of the linkage has a bearing, and the other one of the projection module and one end of the linkage has an axle fitting the bearing.

2. The portable electronic device with the projection function as claimed in claim 1, the projection module further comprises a projection main body, a holder, and a pivoted structure, wherein the projection main body and the holder are pivoted by means of the pivot structure.

3. The portable electronic device with the projection function as claimed in claim 1, wherein the projection module has a first annular wave-shaped surface, and the linkage has a second annular wave-shaped surface corresponding to the first annular wave-shaped surface to pivot stepwise the projection module relative to the linkage.

4. The portable electronic device with the projection function as claimed in claim 3, further comprising:
    a first component, disposed in the projection module; and
    a second component, disposed at the linkage,
    wherein the first component and the second component have a magnetic attraction force there between to force the first annular wave-shaped surface to contact the second annular wave-shaped surface.

5. The portable electronic device with the projection function as claimed in claim 1, wherein the linkage comprises:
    a first linking rod, having a first end and a second end, wherein the first end is pivoted to the accommodating space; and
    a second linking rod, having a third end and a fourth end, wherein the third end is pivoted to the second end of the first linking rod, and the fourth end is pivoted to the projection module.

6. The portable electronic device with the projection function as claimed in claim 5, wherein one of the projection module and the fourth end of the second linking rod has a bearing, and the other one of the projection module and the fourth end of the second linking rod has an axle fitting the bearing.

7. The portable electronic device with the projection function as claimed in claim 6, wherein the projection module has a first annular wave-shaped surface, and the fourth end of the second linking rod has a second annular wave-shaped surface corresponding to the first annular wave-shaped surface to pivot stepwise the projection module relative to the fourth end of the second linking rod.

8. The portable electronic device with the projection function as claimed in claim 7, further comprising:
   a first component, disposed in the projection module; and
   a second component, disposed at the fourth end of the second linking rod,
   wherein the first component and the second component have a magnetic attraction force there between to force the first annular wave-shaped surface to contact the second annular wave-shaped surface.

9. A projection unit, suitable for being disposed in an accommodating space of a portable electronic device, the projection unit comprising:
   a projection module, having at least one connecting portion and for outputting an image beam; and
   a linkage, connecting to the connecting portion of the projection module and disposed between the accommodating space and the projection module for moving the projection module out of the accommodating space, wherein one of the connecting portion of the projection module and one end of the linkage has a bearing, and the other one of the connecting portion of the projection module and one end of the linkage has an axle fitting the bearing.

10. The projection unit as claimed in claim 9, wherein the projection module further comprises a projection main body, a holder, and a pivoted structure, wherein the projection main body and the holder are pivoted by means of the pivot structure.

11. The projection unit as claimed in claim 9, wherein the connecting portion of the projection module has a first annular wave-shaped surface, and the linkage has a second annular wave-shaped surface corresponding to the first annular wave-shaped surface to pivot stepwise the projection module relative to the linkage.

12. The projection unit as claimed in claim 11, further comprising:
   a first component, disposed in the connecting portion of the projection module; and
   a second component, disposed at the linkage,
   wherein the first component and the second component have a magnetic attraction force there between to force the first annular wave-shaped surface to contact the second annular wave-shaped surface.

13. The projection unit as claimed in claim 9, wherein the linkage comprises:
   a first linking rod, having a first end and a second end, wherein the first end is pivoted to the accommodating space of the portable electronic device; and
   a second linking rod, having a third end and a fourth end, wherein the third end is pivoted to the second end of the first linking rod, and the fourth end is pivoted to the connecting portion of the projection module.

14. The projection unit as claimed in claim 13, wherein one of the projection module and the fourth end of the second linking rod has a bearing, and the other one of the projection module and the fourth end of the second linking rod has an axle fitting the bearing.

15. The projection unit as claimed in claim 14, wherein the connecting portion of the projection module has a first annular wave-shaped surface, and the fourth end of the second linking rod has a second annular wave-shaped surface corresponding to the first annular wave-shaped surface to pivot stepwise the projection module relative to the fourth end of the second linking rod.

16. The projection unit as claimed in claim 15, further comprising:
   a first component, disposed in the connecting portion of the projection module; and
   a second component, disposed at the fourth end of the second linking rod,
   wherein the first component and the second component have a magnetic attraction force there between to force the first annular wave-shaped surface to contact the second annular wave-shaped surface.

* * * * *